(12) United States Patent
Baumann et al.

(10) Patent No.: US 7,564,478 B2
(45) Date of Patent: Jul. 21, 2009

(54) APPARATUS FOR CAPTURING ON OBJECT SCENE

(75) Inventors: Rainer Baumann, Überlingen (DE); Reiner Eckhardt, Überlingen (DE)

(73) Assignee: Bodenseewerk Gerätetechnikk GmbH, Überlingen (DE)

( * ) Notice: Subject to any disclaimer, the term of this patent is extended or adjusted under 35 U.S.C. 154(b) by 382 days.

(21) Appl. No.: 10/484,612

(22) PCT Filed: Jan. 21, 2003

(86) PCT No.: PCT/EP03/00565

§ 371 (c)(1),
(2), (4) Date: Aug. 20, 2004

(87) PCT Pub. No.: WO2004/066614

PCT Pub. Date: Aug. 5, 2004

(65) Prior Publication Data
US 2006/0243853 A1    Nov. 2, 2006

(51) Int. Cl.
*H04N 7/18* (2006.01)
(52) U.S. Cl. ........................ 348/146; 348/144; 244/3.16
(58) Field of Classification Search ................ 348/144; 244/3.16
See application file for complete search history.

(56) References Cited

U.S. PATENT DOCUMENTS

| | | | | |
|---|---|---|---|---|
| 2,147,615 | A * | 2/1939 | Baroni | 359/834 |
| 3,709,588 | A * | 1/1973 | Land | 352/78 R |
| 4,009,848 | A * | 3/1977 | Albert et al. | 244/3.16 |
| 4,087,061 | A * | 5/1978 | Burt | 244/3.16 |
| 4,349,838 | A * | 9/1982 | Daniel | 348/169 |
| 4,393,408 | A * | 7/1983 | Beck et al. | 348/202 |
| 4,404,592 | A * | 9/1983 | Pepin et al. | 348/169 |
| 4,475,039 | A * | 10/1984 | Christiansen et al. | 250/334 |
| 6,036,140 | A * | 3/2000 | Tranapp et al. | 244/3.16 |
| 6,116,537 | A * | 9/2000 | Kempas | 244/3.16 |

(Continued)

FOREIGN PATENT DOCUMENTS

DE    33 17 232 A1    5/1983

(Continued)

*Primary Examiner*—Marsha D Banks Harold
*Assistant Examiner*—Christopher Findley
(74) *Attorney, Agent, or Firm*—Scully, Scott, Murphy & Presser, P.C.

(57) ABSTRACT

An apparatus for capturing an object scene, in particular a seeking head for target-tracking missiles, such that, with a detector 86 in fixed relationship with a structure, it is possible to capture a large spatial angle. For that purpose the imaging optical system (30) has a system portion (28) facing the object scene which is pivotable with a pitch frame (24) about a pitch axis (26) perpendicular to a roll axis (18). The pitch frame (24) is mounted pivotably about the pitch axis (26) in a roll frame (16) which is supported in the structure (10) rotatably about the roll axis (18). The system portion (28) includes first beam deflection structure (36) by which the imaging beam path of the imaging optical system (30) is deflectable in a direction along the pitch axis (26). The imaging optical system (30) further includes second beam deflection structure (52) which are rotatable with the roll frame (16) and by which the deflected beam path is picked up along the pitch axis (26) and deflected in the direction of the roll axis (18). The detector (86) is arranged on the roll axis (18).

12 Claims, 2 Drawing Sheets

U.S. PATENT DOCUMENTS 6,193,188 B1 * 2/2001 Ahmad et al. .............. 244/3.16
6,198,564 B1 * 3/2001 Knight .................... 359/214.1
6,648,817 B2 * 11/2003 Schara et al. ............... 600/173
6,672,535 B2 * 1/2004 Brunner et al. ............ 244/3.16
6,978,965 B1 * 12/2005 Hartmann et al. .......... 244/3.16

FOREIGN PATENT DOCUMENTS

DE      34 38 544 C2    10/1984
DE      198 24 899 C1    6/1998
EP      0 629 890 B1    6/1994

* cited by examiner

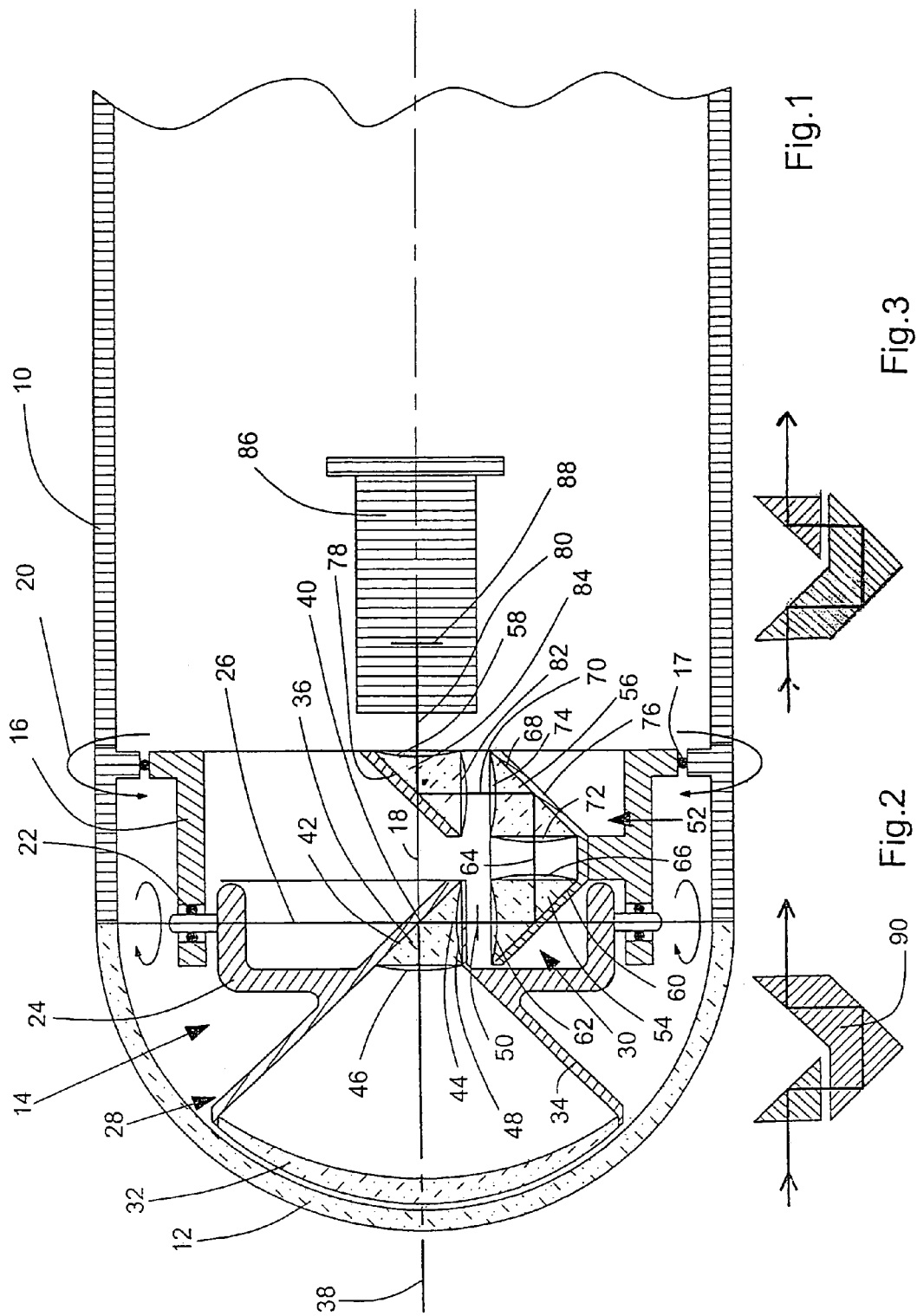

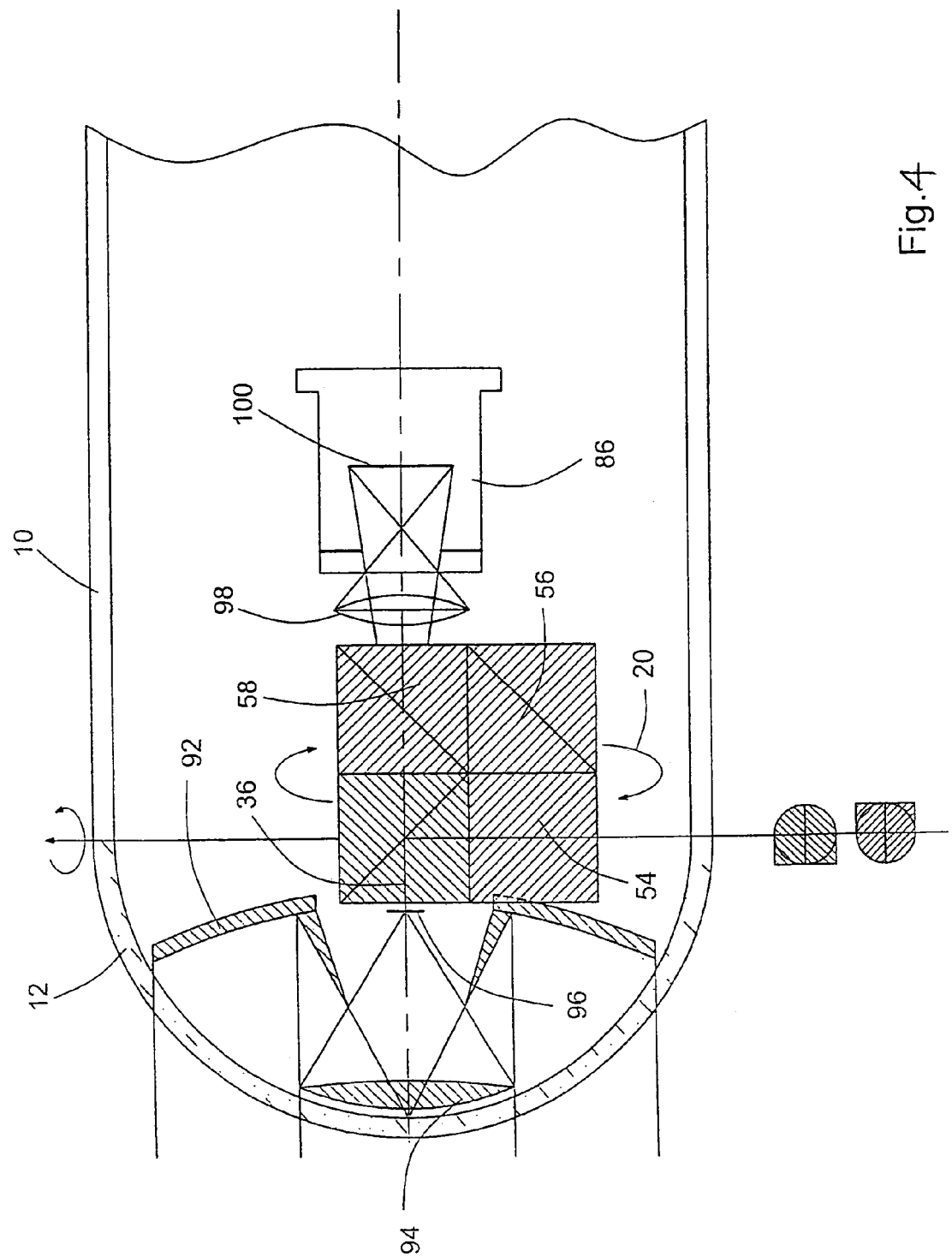

APPARATUS FOR CAPTURING ON OBJECT SCENE

BACKGROUND OF THE INVENTION

1. Field of the Invention

The invention concerns an apparatus for capturing an object scene, including an imaging optical system which is pivotable relative to a structure and a detector which is fixed with respect to the structure and on which an image of the object scene is produced by the imaging optical system.

This apparatus may involve a seeking head for a target-tracking missile. The invention however can also be used in relation to an "all-around search arrangement", that is to say a stationary apparatus by which a large field of view is continuously scanned. Such an all-around search arrangement is described and illustrated for example in EP 0 629 890 B1.

2. Discussion of the Prior Art

In known seeking heads for target-tracking missiles with a detector which is fixed with respect to the structure, an imaging optical system is supported cardanically about two axes which extend substantially perpendicularly to the longitudinal axis or roll axis of the missile, namely about a pitch axis and a yaw axis. In that way the optical system can be pivoted with two degrees of freedom about the detector which is fixed with respect to the structure, and oriented onto a target. An example of such a seeking head is described in DE 34 38 544 C2. In that case the squint angle of the seeking head, that is to say the inclination of the optical axis of the optical system relative to the longitudinal axis of the missile, is limited by the mechanics of the cardanic support arrangement.

Seeking heads are known, in which an imaging optical system is carried in a pitch frame which is pivotable about a pitch axis relative to a roll frame. The roll frame in turn is supported in the structure of the missile rotatably about a roll axis coincident with the longitudinal axis of the missile (see DE 33 17 232 A1 and DE 198 24 899 C1). In those known seeking heads the detector is not fixed with respect to the structure but is provided on the pitch frame. That makes it difficult to take out the signals of the detector.

SUMMARY OF THE INVENTION

The object of the invention is to design an apparatus of the kind set forth in the opening part of this specification for capturing an object scene, in such a way that, with a detector which is fixed with respect to structure, it is possible to detect a large spatial angle.

In accordance with the invention that object is attained in that (a) the imaging optical system has an object-side system portion which is pivotable with a pitch frame about a pitch axis perpendicular to a roll axis, (b) the pitch frame is supported pivotably about the pitch axis in a roll frame which is supported rotatably about the roll axis in the structure, (c) the object-side system portion includes first beam deflection means by which the imaging beam path of the imaging optical system can be deflected in a direction along the pitch axis, (d) the imaging optical system further includes second beam deflection means which are rotatable with the roll frame and by which the deflected beam path is picked up along the pitch axis and deflected in the direction of the roll axis, and (e) the detector which is fixed with respect to the structure is arranged on the roll axis.

The use of a cardan system comprising the pitch frame and the roll frame makes it possible to capture a large spatial angle. In a suitable structural configuration the object-side system portion can be pivoted with respect to the roll frame about the pitch axis through more than 90°, without that movement being impeded by the roll frame. The rotation of the roll frame about the roll axis permits orientation of the system portion within an angle of 360°. In contrast to known roll-pitch systems however the detector is not arranged on the pitch frame but is arranged fixedly with respect to the structure on the roll axis. That is made possible by virtue of deflection of the imaging beam path. The imaging beam path is firstly deflected by the first beam deflection means in such a way that it extends along the pitch axis. The beam path is then not influenced by pivotal movement of the object-side system portion about the pitch axis, except for image rotation. The second beam deflection means which are rotatable with the roll frame capture the beam path deflected in that way, on the pitch axis, and deflect it in such a way that it extends along the roll axis. The detector which is fixed with respect to the structure is disposed on the roll axis which in fact is fixed with respect to the structure.

Embodiments of the invention are the subject-matter of the appendant claims.

BRIEF DESCRIPTION OF THE DRAWINGS

An embodiment by way of example of the invention is described in greater detail hereinafter with reference to the accompanying drawings in which:

FIG. 1 is diagrammatic broken-away view in longitudinal section of a missile with a seeking head, FIG. 2 shows a modification of a detail of the imaging optical system, FIG. 3 shows a further modification of a detail of the imaging optical system, and FIG. 4 shows another embodiment of the seeking head.

DETAILED DESCRIPTION OF THE INVENTION

In FIG. 1 reference 10 denotes the structure of a target-tracking missile. The nose of the missile is formed by a hemispherical dome or window 12. A seeking head 14 is disposed behind the dome 12.

The seeking head 14 has a roll frame 16. The roll frame 16 is supported in bearing means 17 rotatably about a roll axis 18. This is indicated in FIG. 1 by the arrows 20. The roll axis 18 here coincides with the longitudinal axis of the missile. A pitch frame 24 is supported in the roll frame 16 pivotably about the pitch axis 26 by way of bearing means 22. The roll frame 16 permits a pivotal movement of the pitch frame and the parts carried therein about the pitch axis 26 through an angle of about 180°, that is to say 90° rearwardly in FIG. 1 and 90° forwardly.

Carried in the pitch frame 24 is an object-side system portion 28 of an imaging optical system which is generally identified by reference 30. The object-side system portion 28 includes a lens 32 which is mounted in a funnel-shaped holder 34 which is formed on the pitch frame, and first beam deflection means in the form of a deflection prism 36. The object-side system portion 28 of the imaging optical system 30 defines an optical axis 38. The optical axis 38 extends perpendicularly to the pitch axis 26. In the illustrated central position of the pitch frame 24 the optical axis 38 coincides with the longitudinal axis of the missile and the roll axis 18. The roll axis 18, the pitch axis 26 and the optical axis 38 intersect at the center point 40 of the curvature of the hemispherical dome 12. The cross-section of the deflection prism 36 which is connected to the pitch frame 24 substantially forms an isosceles right triangle. The deflection prism 36 accordingly has a "hypotenuse surface" 42. That hypotenuse surface 42 forms an angle of 45° with the optical axis 38. The imaging beam path of the imaging optical system 30 is therefore deflected through 90° by total reflection at the hypotenuse surface 42 so that the optical axis 44 of the deflected beam path now coincides with the pitch axis 26. In that situation the beam path passes perpendicularly through the two "cathetus surfaces" 46 and 48 of the deflection prism 36. In the embodiment shown in FIG. 1 the cathetus surface 46 is convexly curved and cathetus surface 48 is concavely curved. As a result the deflection prism 36 has a lens action. The deflection prism 36, in conjunction with the lens 32, produces an intermediate image 50 of the object scene.

The use of the deflection prism 36 as a lens reduces the number of reflecting surfaces and thus light losses and scattered light. In addition the optical system can be passively temperature-compensated by clever choice of the prism materials and refractive powers.

The deflected imaging beam path is picked up by second beam deflection means which are generally identified by reference 52. The second beam deflection means 52 are supported fixedly in the roll frame 16 and are rotatable therewith about the roll axis 18. The second beam deflection means 52 have a second deflection prism 54, a third deflection prism 56 and a fourth deflection prism 58. The cross-sections of the deflection prisms 54, 56 and 58, similarly to the deflection prism 36, are isosceles right triangles with hypotenuse surfaces at which the imaging beam path is totally reflected and with cathetus surfaces which extend perpendicularly to the optical axis of the imaging beam path.

The second deflection prism 54 is disposed on the pitch axis 26. Its hypotenuse surface 60 is inclined at 45° relative to the pitch axis 26 and to the once-deflected optical axis 44. A cathetus surface 62 is perpendicular to the optical axis 44 and is opposite to the cathetus surface 46 of the deflection prism 36. The intermediate image 50 is for example between the cathetus surfaces 48 and 62. The imaging beam path is deflected through 90° a second time by the deflection prism 54 so that the twice-deflected optical axis 64 extends parallel to the roll axis 18 in the plane defined by the pitch axis 26 and the roll axis 18. The twice-deflected optical axis 64 issues through the cathetus surface 66 of the second deflection prism 54.

The third deflection prism 56 is disposed on the twice-deflected optical axis 64. Its hypotenuse surface 68 is again inclined at 45° relative to the optical axis 64 and perpendicular to the hypotenuse surface 60 of the second deflection prism 54 and by total reflection again deflects the imaging beam path through 90° parallel to the pitch axis 26 inwardly towards the roll axis 18. The triple-deflected optical axis 70 also extends in the plane defined by the pitch axis 26 and the roll axis 18. The entry-side cathetus surface 72 of the third deflection prism 56 is perpendicular to the twice-deflected optical axis 64 and opposite the exit-side cathetus surface 66 of the second deflection prism 54. The exit-side cathetus surface 74 of the third deflection prism is perpendicular to the triple-deflected optical axis 70.

The second and the third deflection prisms 54 and 56 are carried with their hypotenuse surfaces in a roof-shaped holder 76 in the roll frame 16.

The hypotenuse surface 78 of the fourth deflection prism 58 is parallel to the hypotenuse surface 68 of the third deflection prism 56 and inclined through 45° relative to the triple-deflected optical axis 70. The fourth deflection prism 58 is arranged in the roll frame 16 on the roll axis 18. Total reflection at the hypotenuse surface 78 causes the imaging beam path to be deflected through 90° a fourth time so that the quadruple-deflected optical axis 80 of the imaging beam path coincides with the roll axis 18. The entry-side cathetus surface 82 of the fourth deflection prism 58 is perpendicular to the triple-deflected optical axis 70 and is opposite the exit-side cathetus surface 74 of the third deflection prism. The exit-side cathetus surface 84 of the fourth deflection prism 58 is towards a detector 86 which is fixed with respect to the structure.

The cathetus surfaces 62, 66, 72, 74, 82 and 84 are curved so that the associated deflection prisms act at the same time as lenses. Those lenses form a detector-side system portion of the imaging optical system 30, by which an image 88 of the object scene is produced on the grid of detector elements of the detector 86.

The described arrangement operates as follows:

The pitch frame 24 permits a pivotal movement of the optical axis 38 about the pitch axis 26 over an angle of about 90° forwardly and rearwardly in FIG. 1. The roll frame 16 permits a rotary movement of the pitch axis 26 about the roll axis 18 over an angle of 360°. As a result, the optical axis 36 can be oriented in any direction within the hemispherical spatial angle covered by the dome 12. Due to the deflection of the beam path by the first deflection prism 36 the imaging beam path is not influenced by the pivotal movement about the pitch axis 26, except for image rotation. The imaging beam path falls on the second deflection prism 54, in any position of the pitch frame. The imaging beam path is guided onto the stationary detector 86 by the deflection prisms 54, 56 and 58, more specifically in any position of the roll frame 16. The arrangement of the detector, in fixed relationship with the structure, facilitates signal transmission and the feed of coolant to the detector.

Intermediate imaging and the fact that the deflection prisms 54, 56 and 58 are in the form of lenses makes it possible for the beam cross-section of the imaging beam path on passing through the deflection prisms 54, 56 and 58 to be kept small.

Instead of the deflection prisms 36, 54, 56 and 58, it is also possible to provide deflection mirrors. It is also possible for the deflection prisms 54, 56 and 58 to be combined to form a single body 90, as is shown in FIG. 2.

As a difference in relation to the construction shown in FIG. 1 it is also possible for the pitch axis to be displaced in a direction towards the detector and to be arranged along the beam path 70, in comparison with FIG. 1. When this design configuration is adopted, the reflecting means 54 and 56 shown in FIG. 1 are then arranged on the pitch frame and are pivotable therewith. In that case so-to-speak the first three reflecting means, shown in the form of deflection prisms 36, 54 and 56, then form the first beam deflection means of the object-side system portion. In that case the intermediate image is produced between the third and fourth reflecting means, in FIG. 1 approximately at the level of reference numeral 70. In that case, as shown in FIG. 3, the deflection prisms 36, 54 and 56 can be combined to form a single body.

The embodiment shown in FIG. 4 corresponds in principle to that shown in FIG. 1. Corresponding parts are denoted by the same references in FIG. 4 as in FIG. 1.

In contrast to the embodiment of FIG. 1 the object-side system portion of the imaging optical system is a Cassegrain system with an annular hollow mirror 92 and a convex secondary mirror 94. An intermediate image 96 is produced for example closely in front of the first deflection prism 36. The deflection prisms 36, 54, 56 and 58 are respectively parts of cubes with a reflecting diagonal surface. A separate lens 98 produces the image 100 of the object scene on the detector.

The invention claimed is:

1. Apparatus for capturing an object scene, including a roll-pitch imaging optical system (30) which is pivotable at precisely two degrees of freedom relative to a structure (10) and a detector (86) which is fixed with respect to the structure and on which an image of the object scene is produced by the imaging optical system (30), wherein
    (a) the imaging optical system (30) includes a system portion (28) facing the object scene which is directly pivotable with a pitch frame (24) about a pitch axis (26) perpendicular to a roll axis (18) over a range of at least +/−90° relative to said roll axis (18),
    (b) the pitch frame (24) is supported pivotably about the pitch axis (26) in a roll frame (16) which is supported rotatably for rotation over a range of 360° about the roll axis (18) in the structure (10),
    (c) the system portion (28) includes first beam deflection means by which the imaging beam path of the imaging optical system (30) is deflectable in a direction along the pitch axis (26),
    (d) the imaging optical system (30) further includes second beam deflection means (52) which are rotatable with the roll frame (16) and by which the deflected beam path of the first beam deflection means is picked up along the pitch axis (26) and deflected in the direction of the roll axis (18), and
    (e) the detector (86) is arranged on the roll axis (18).

2. Apparatus as set forth in claim 1, wherein
    (a) the system portion (28) has the first beam deflection means including first reflecting means (36) by which the imaging beam path of the imaging optical system (30) is deflectable in a direction along the pitch axis (26),
    (b) provided in the roll frame (16) and rotatable therewith on the pitch axis (26) are second reflecting means (54) by which the imaging beam path of the imaging optical system (30) is deflectable in a direction parallel to the roll axis (18),
    (c) provided in the roll frame (16) and rotatable therewith there are third reflecting means (56) by which the imaging beam path deflected in that way is deflectable towards the roll axis (18) in a direction parallel to the pitch axis (26), and
    (d) provided in the roll frame (16) and rotatable therewith on the roll axis (18) are fourth reflecting means (58) by which the imaging beam path deflected by the third reflecting means (56) is deflectable in the direction of the roll axis (18) onto the detector (86), the second, third and fourth reflecting means forming the second beam deflection means (52).

3. Apparatus as set forth in claim 1, wherein
    (a) the system portion (28) in the pitch frame (24) has first reflecting means (36) by which the imaging beam path of the imaging optical system (30) is deflectable in a direction parallel to the pitch axis (26),
    (b) provided in the pitch frame (24) is a second reflecting means (54) by which the imaging beam path of the imaging optical system (30) is deflectable in a direction parallel to the roll axis (18),
    (c) in the pitch frame (24) there is further a third reflecting means (54) by which the imaging beam path deflected in that way is deflectable towards the roll axis (18) in a direction along the pitch axis (26), the first, second and third reflecting means forming the first beam deflection means, and (d) in the roll frame (16) and rotatable therewith on the roll axis (18) as second beam deflection means there are provided fourth reflecting means (58) by which the imaging beam path deflected by the third reflecting means (56) is deflectable in the direction of the roll axis (18) onto the detector (86).

4. Apparatus as set forth in claim 2 or claim 3, wherein
    the reflecting means are deflection prisms (36, 65, 56, 58) of a cross-section substantially forming an isosceles right triangle, whose totally reflecting hypotenuse surfaces (42, 60, 68, 78) deflect the imaging beam path, wherein the cathetus surfaces (62, 66; 72, 74; 82, 84) are respectively perpendicular to the optical axis of the imaging beam path.

5. Apparatus as set forth in claim 4, wherein
    at least a part of the cathetus surfaces form curved lens surfaces.

6. Apparatus as set forth in claim 4, wherein
    the plurality of deflection prisms forming the first or the second beam deflection means is formed by a continuous body (90).

7. Apparatus as set forth in claim 2 or claim 3, wherein
    (a) the imaging optical system (30) is arranged behind a hemispherical dome (12),
    (b) the pitch and roll axes (26, 18) perpendicularly intersect at the center point (40) of curvature of said dome (12), and
    (c) the reflecting surface of the first reflecting means (36) extends at 45° relative to the roll axis (18) through said intersection point (40).

8. Apparatus as set forth in one of claims 1 through 3, wherein
    the imaging optical system (30) produces at least one intermediate image (50) in the region of the beam deflection means (36, 52).

9. Apparatus as set forth in claim 8, wherein
    the intermediate image is produced by the system portion (28) between the first and second beam deflection means (36, 52).

10. A missile which is equipped with an apparatus as set forth in claim 1.

11. Apparatus for capturing an object scene, including a roll-pitch imaging optical system (30) which is pivotable at precisely two degrees of freedom relative to a structure (10) and a detector (86) which is fixed with respect to the structure and on which an image of the object scene is produced by the imaging optical system (30), wherein
    (a) the imaging optical system (30) includes a system portion (28) facing the object scene which is directly pivotable with a pitch frame (24) about a pitch axis (26) perpendicular to a roll axis (18) over a range of at least +/−90° relative to said roll axis (18),
    (b) the pitch frame (24) is supported pivotably about the pitch axis (26) in a roll frame (16) which is supported rotatably for rotation over a range of 360° about the roll axis (18) in the structure (10),
    (c) the system portion (28) includes first beam deflection means by which the imaging beam path of the imaging optical system (30) is deflectable in a direction along the pitch axis (26),
    (d) the imaging optical system (30) further includes second beam deflection means (52) which are rotatable with the roll frame (16) and by which the deflected beam path of the first beam deflection means is picked up along the pitch axis (26) and deflected in the direction of the roll axis (18),
    (e) the detector (86) is arranged on the roll axis (18), and (f) said first and second beam deflection means each being formed by reflecting means in the shape of deflection prisms.

12. Apparatus for capturing an object scene, including a roll-pitch imaging optical system (30) which is pivotable at precisely two degrees of freedom relative to a structure (10) and a detector (86) which is fixed with respect to the structure and on which an image of the object scene is produced by the imaging optical system (30), wherein
- (a) the imaging optical system (30) includes a system portion (28) facing the object scene which is directly pivotable with a pitch frame (24) about a pitch axis (26) perpendicular to a roll axis (18) over a range of at least +/−90° relative to said roll axis (18),
- (b) the pitch frame (24) is supported pivotably about the pitch axis (26) in a roll frame (16) which is supported rotatably for rotation over a range of 360° about the roll axis (18) in the structure (10),
- (c) the system portion (28) includes first beam deflection means by which the imaging beam path of the imaging optical system (30) is deflectable in a direction along the pitch axis (26),
- (d) the imaging optical system (30) further includes second beam deflection means (52) which are rotatable with the roll frame (16) and by which the deflected beam path of the first beam deflection means is picked up along the pitch axis (26) and deflected in the direction of the roll axis (18),
- (e) the detector (86) is arranged on the roll axis (18), and
- (f) the imaging optical system (30) produces at least one intermediate image (50) in the region of the beam deflection means (36, 52).

* * * * *